(12) United States Patent
Camurdan et al.

(10) Patent No.: US 9,329,602 B2
(45) Date of Patent: May 3, 2016

(54) COLD START VALVE AND HYDRAULIC ARRANGEMENT HAVING A COLD START VALVE OF THIS TYPE

(71) Applicant: Robert Bosch GmbH, Stuttgart (DE)

(72) Inventors: Hakan Camurdan, Neu-Ulm (DE); Juergen Gintner, Elchingen (DE); Stefan Rundstadler, Nersingen (DE); Johann Wuchenauer, Bibertal (DE); Alexander Patrick Steiner, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 14/048,095

(22) Filed: Oct. 8, 2013

(65) Prior Publication Data

US 2014/0099223 A1    Apr. 10, 2014

(30) Foreign Application Priority Data

Oct. 8, 2012  (DE) .......................... 10 2012 218 270

(51) Int. Cl.
*F16K 11/07*    (2006.01)
*G05D 16/04*    (2006.01)
*G05D 16/20*    (2006.01)

(52) U.S. Cl.
CPC ............ *G05D 16/04* (2013.01); *G05D 16/2093* (2013.01); *Y10T 137/7764* (2015.04)

(58) Field of Classification Search
CPC .......... F16K 17/04; F16K 17/02; F16K 17/00
USPC ........ 137/625.6, 625.69, 625.25, 625.65, 489
See application file for complete search history.

(56) References Cited

U.S. PATENT DOCUMENTS

| | | | |
|---|---|---|---|
| 2,570,317 A * | 10/1951 | Busson | ........................... 60/461 |
| 2003/0070715 A1* | 4/2003 | Royle | ....................... 137/625.65 |
| 2004/0256012 A1* | 12/2004 | Bruck et al. | ............. 137/625.65 |
| 2011/0266479 A1* | 11/2011 | Gautier et al. | ................ 251/282 |

FOREIGN PATENT DOCUMENTS

EP    1662186 A1 *  5/2006

* cited by examiner

*Primary Examiner* — Craig Schneider
*Assistant Examiner* — Angelisa L Hicks
(74) *Attorney, Agent, or Firm* — Maginot, Moore & Beck LLP (57) ABSTRACT

A cold start valve for a hydraulic circuit has a valve slide with two counteracting control faces. It is possible to load a first control face with a control pressure and to load a second control face with a feed pressure. In addition, the first control face is loaded with the spring force of a valve spring. A damping space is configured to damp a stroke movement of the valve slide. The damping space is delimited by a damping face formed on the valve slide and oriented in accordance with the first control face. The damping face is configured to be loaded via the damping space with a damping pressure to damp the stroke movement. The damping space is connected in a throttled manner to a pressure space. The second control face of the valve slide is configured to be loaded with the feed pressure via the pressure space.

16 Claims, 4 Drawing Sheets

COLD START VALVE AND HYDRAULIC ARRANGEMENT HAVING A COLD START VALVE OF THIS TYPE

This application claims priority under 35 U.S.C. §119 to patent application no. DE 10 2012 218 270.5, filed on Oct. 8, 2012 in Germany, the disclosure of which is incorporated herein by reference in its entirety.

BACKGROUND

The disclosure relates to a cold start valve according to the description below and to a hydraulic arrangement having a cold start valve of this type.

EP 1 662 186 B1 has disclosed a hydraulic circuit having a cold start valve. Said hydraulic circuit has a pivotable hydraulic pump which can be connected via two working lines to a consumer. The consumer is, for example, a hydraulic motor for driving a wheel of a motor vehicle, it being possible for the hydraulic motor to be used, in particular, to assist the traction force of the motor vehicle. The pivotable hydraulic pump is driven via a drive shaft, to which a feed pump is additionally connected. Said feed pump serves to convey a pressure medium from a tank to, in particular, feed valve units of the hydraulic circuit. Here, a pressure medium filter for filtering the pressure medium is arranged either on the suction side or on the pressure side of the feed pump.

If the filter is arranged on the pressure side, it is arranged in a feed pressure reduction device. Said device has a feed pressure inlet connection which is connected to the feed pump and a feed pressure outlet connection which is connected to the feed valve units. The filter is then provided in the pressure medium flow path between the feed pressure inlet connection and the feed pressure outlet connection. The cold start valve is connected between the filter and the feed pressure inlet connection. On the outlet side, the cold start valve is connected to a suction line of the feed pump. The cold start valve can open and close a pressure medium connection in a controlled manner between the outlet-side feed line of the feed pump and the inlet-side suction line of the feed pump and can lower a feed pressure in the feed line by way of opening said connection in a controlled manner. A valve slide of the cold start valve is loaded in an opening direction by the pressure between the filter and the feed pressure inlet connection and in a closing direction by a spring force of a valve spring and a control pressure which can be set via a pilot valve. The pilot valve is likewise part of the feed pressure reduction device and is connected via a throttle to the pressure medium flow path between the filter and the feed pressure outlet connection and, furthermore, is connected to the suction line of the feed pump. The control pressure for the cold start valve is tapped off between the throttle and the pilot valve. The pilot valve is a 2/2-way valve, the valve slide of which can be loaded with a spring force via a valve spring in the direction of its closed position and can be loaded with a force of an electric actuator in the direction of its open position.

The pressure in the feed line can be reduced considerably by the feed pressure reduction device, as a result of which a load for a starter is reduced greatly during starting of the working pump, for example in the case of a cold start. In order to reduce the feed pressure, the valve slide of the pilot valve is moved into its open position by the actuator, as a result of which the pressure downstream of the throttle drops and therefore the control pressure for the cold start valve drops. If a feed pressure exceeds the sum of the control pressure and a pressure equivalent of the spring of the valve spring of the cold start valve, the valve slide of the cold start valve is displaced in the opening direction, as a result of which the feed line of the feed pump is connected fluidically to the suction line and the feed pressure therefore drops.

During use of the cold start valve, it has been shown that pronounced oscillations occur in the hydraulic circuit as a result of said cold start valve.

SUMMARY

In contrast, the disclosure is based on the object of providing a cold start valve which has comparatively low oscillations, in particular pressure oscillations, during use and/or leads to comparatively small oscillations in components which are operatively connected to the cold start valve. Furthermore, the disclosure is based on the object of providing a hydraulic arrangement which has comparatively low oscillations in use.

The object with regard to the cold start valve is achieved according to the features described below and with regard to the hydraulic arrangement according to the features described below.

Other advantageous developments of the disclosure are the subject matter of further description below.

According to the disclosure, a valve, in particular a cold start valve, for a hydraulic circuit has a valve slide. Via the latter, a pressure medium connection can be controlled between a pressure connection, in particular a feed medium inlet connection, and an outlet connection, in particular a pressure reduction connection, in order to reduce a feed pressure, in particular, during idling of a working pump of a hydraulic circuit. The valve slide has two control faces which point away from one another. The first control face delimits a control space, via which it can be loaded with pressure medium in the closing direction of the valve slide, it being possible, in particular, for a control pressure which can be controlled by a pilot valve to act on the first control face. The second control face can be loaded with pressure medium via an inlet space in the opening direction, a pump or feed pressure, in particular, acting on the control face. Here, the inlet space is delimited by the control face and is connected fluidically to the pressure connection. In the closing direction, the valve slide is loaded additionally by a spring force of a valve spring. The valve slide is therefore controlled via a pressure difference between the control faces. According to the disclosure, the valve slide has a damping face which can be loaded with pressure medium, in particular in the closing direction of the valve slide, and delimits the damping space. Here, the damping space is connected fluidically to the inlet space via a throttle.

This solution has the advantage that, during a stroke movement of the valve slide, a pressure in the damping space is adjusted to the pressure in the inlet space in a time-delayed manner on account of the throttled fluidic connection to the inlet space. During a displacement of the valve slide in the direction of a reduction in size of the damping space, the pressure in the damping space as a rule exceeds the pressure in the inlet space over a defined time, as a result of which a stroke movement of the valve slide is damped. During a stroke movement in the opposite direction, that is to say in the direction of an increase in size of the damping space, the pressure in the damping space is lower over a defined time than the pressure in the inlet space, which likewise leads to a damping effect. The damping face, on which the pressure in the damping space acts, therefore leads to a reduction in the oscillations of the valve slide and the cold start valve and therefore also to a reduction in oscillations of a hydraulic arrangement which uses the cold start valve. The time which is required for the pressure in the damping space to be adjusted to the pressure in the inlet space is dependent on the size of the throttle cross section of the throttle in the flow path between the two spaces.

In a further refinement of the disclosure, the control face which acts in the opening direction corresponds approximately to a sum of the control face which acts in the closing direction and the damping face. The damping face therefore leads only to a damping action when there is a pressure gradient between the inlet space and the damping space. If there is no pressure gradient, for example after a stroke movement of the valve slide, a pressure which prevails on the face section, corresponding to the damping face, of the control face which acts on the opening direction counteracts the pressure which prevails at the damping face at approximately the same level.

The valve slide preferably has a radial collar, the first annular end face of which forms the control face which acts in the opening direction and delimits the inlet space. The radial collar is recessed radially from the other end face by way of a step, as a result of which two annular faces which point away from the first end face are formed. The annular face which is further away from the first end face as viewed in the axial direction forms the second end face of the radial collar and is preferably that control face of the valve slide which acts in the closing direction. That annular face of the valve slide which is formed between the end faces on account of the step then forms the damping face. By way of a valve slide of this type, the control faces and the damping face can be of extremely simple structural configuration.

If the valve is configured as a seat valve, it has been shown that, in combination with the damping face, this leads to extremely low oscillations during opening and closing of a pressure medium flow path in a controlled manner.

In a simple way in terms of device technology, the valve slide can be arranged such that it can be displaced in a stepped bore which is made in a valve housing. The stepped bore preferably has three steps, the valve slide being guided slidingly with one end section in a first step which has the smallest diameter. In the second step which adjoins said smallest step, the valve slide is then preferably mounted in the region of the radially recessed section of the radial collar. It then delimits the control space together with its annular control face which acts in the closing direction and the second step. The damping space is then delimited by a third step, which has the greatest diameter, together with the damping face, the valve slide being arranged at least in sections in said third step with its non-recessed section of the radial collar. The valve slide can bear against a valve seat with its second end section which projects away, in particular, from the radial collar. The inlet space is preferably delimited by its control face which acts in the opening direction and its circumferential face of the second end section.

It has proven advantageous that the control face which acts in the closing direction is loaded not only by the pressure medium but also by the spring force of the valve spring, as a result of which said forces which act in the closing direction are introduced into the valve slide in the region of the radial collar. Here, the valve spring advantageously engages around the valve slide and is supported on the step transition between the first and the second step of the stepped bore.

In order to connect the damping space to the inlet space in a simple way, an intermediate space is provided which is delimited between an inner circumferential face of the third step of the stepped bore and an outer circumferential face of the radial collar, in particular of the non-recessed section of the radial collar. Via said intermediate space, pressure medium can therefore flow from the damping space to the inlet space or vice versa. Here, the size of the intermediate space is selected in such a way that it leads to a desired throttling action.

The intermediate space is preferably configured as an annular space, as a result of which the inner circumferential face of the damping space and the outer circumferential face of the radial collar are spaced apart substantially from one another. The valve slide is then advantageously guided slidingly only in the first and the second step of the stepped bore. As a consequence, merely a tolerance, in particular with regard to a diameter and a coaxiality, between the valve slide and the first and second steps has to be low, and a tolerance between the valve slide and the third step can be comparatively large.

It goes without saying that the intermediate space can also be configured simply by one or more grooves in the valve slide and/or in the valve housing or by one or more flattened portions of the valve housing and/or of the valve slide. It would also be conceivable that the intermediate space which is configured as an annular space has a certain eccentricity in cross section.

A width of the annular space is preferably substantially 0.15 mm or substantially 0.1 mm.

According to the disclosure, a hydraulic arrangement for a hydraulic circuit having a hydraulic pump or working pump which can be, in particular, swiveled or pivoted, for supplying pressure medium to a hydraulic consumer has a cold start valve according to the disclosure. Said cold start valve serves to limit a feed pressure upstream of a feed pump of the hydraulic arrangement. Here, the feed pump is used for supplying pressure medium, in particular, to a feed valve unit for the hydraulic circuit.

The solution has the advantage that the oscillations of the hydraulic arrangement are reduced considerably by the damped cold start valve.

A pressure which prevails at the control face, acting in the opening direction, of the valve slide of the valve can preferably be controlled by a pilot valve.

In a simple way in terms of device technology, the valve and the pilot valve can be arranged in a valve block. A pressure medium connection between a feed medium inlet connection of the valve block, which feed medium inlet connection is connected to an outlet connection of the feed pump, and a pressure reduction connection of the valve block can then be capable of being controlled by way of the valve. Furthermore, a feed medium outlet connection can be formed on the valve block.

A filter can preferably be connected to the valve block. To this end, a filter inlet connection is preferably provided which is connected fluidically to the flow path between the valve and the feed medium inlet connection. Furthermore, a filter outlet connection can be provided which is connected fluidically to the feed medium outlet connection.

The pilot valve is preferably connected on the inlet side via a throttle to the flow path between the filter outlet connection and the feed medium outlet connection and on the outlet side to the pressure reduction connection or a further pressure reduction connection or tank connection. The control pressure for the valve can then be tapped off in the flow path between the throttle and the pilot valve.

BRIEF DESCRIPTION OF THE DRAWINGS

In the following text, one preferred embodiment of the disclosure will be explained in greater detail using diagrammatic drawings, in which.

DETAILED DESCRIPTION

Figure 1:
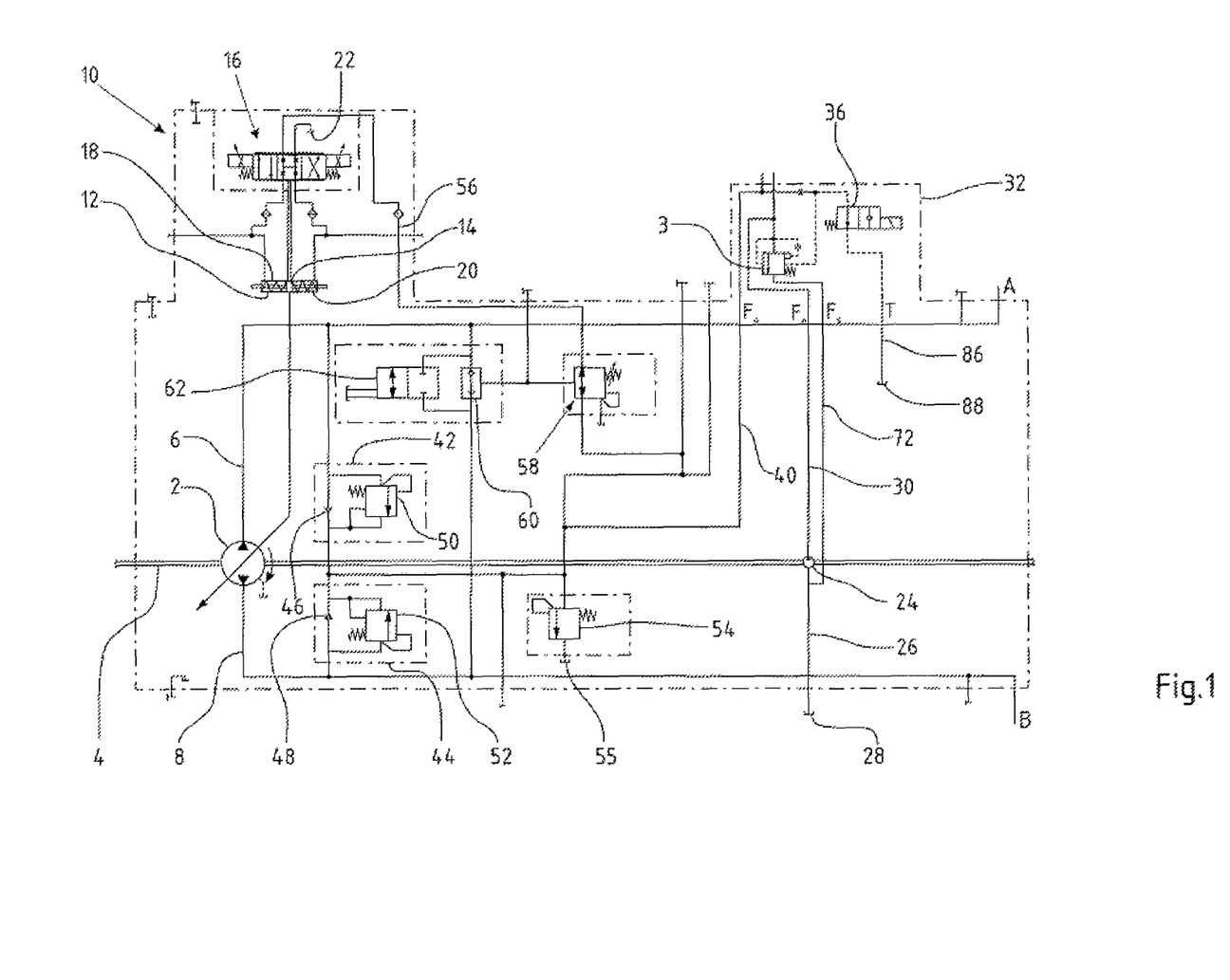
FIG. 1 shows a circuit diagram of a hydraulic arrangement according to the disclosure with a cold start valve according to the disclosure, in accordance with one exemplary embodiment.

A hydraulic arrangement 1 according to FIG. 1 has a cold start valve 3 according to the disclosure for limiting a feed pressure. The arrangement has a pivotable hydraulic pump 2 which can be driven via a drive shaft 4 and is part of a closed circuit, to which, for example, hydraulic consumers (not shown in FIG. 1) in the form of hydraulic motors can be connected for driving wheels of a motor vehicle, in particular a lorry.

Parts of the hydraulic arrangement 1 are sufficiently well known from the prior art, for which reason only what is essential to the disclosure is explained in the following text and reference is made otherwise to the prior art, for example to EP 1 662 186 B1 which was mentioned at the outset.

In the hydraulic arrangement 1, two working lines 6 and 8 are provided in order to connect the at least one consumer, which working lines 6 and 8 are connected in each case to an outlet connection of the hydraulic pump 2 and open in each case into a consumer connection A and B, respectively.

An adjusting device 10 is provided for adjusting the hydraulic pump 2. Said adjusting device 10 has an actuating cylinder 12 which is configured as a synchronous cylinder and the piston 14 of which is coupled mechanically to the hydraulic pump 2 in order to swivel the latter. The actuating piston 12 can be controlled by an actuating pressure control valve 16. To this end, the actuating cylinder 12 has two cylinder spaces 18 and 20 which are separated by the actuating piston 14 and can be connected fluidically via the actuating pressure control valve 16 either to a tank 20 or a feed pump 24, the feed pressure of which can be limited by the cold start valve 3 according to the disclosure.

The feed pump 24 is driven together with the hydraulic pump 2 via the drive shaft 4. On the inlet side, a suction line 26 which is connected to a tank 28 is attached to the feed pump 24. On the outlet side, the feed pump 24 is connected fluidically to a feed pressure line 30 which opens into a feed medium inlet connection $F_e$ of a valve block 32 which will be explained in greater detail below in FIG. 2. Said valve block 32 has a cold start valve 3 which is controlled via a pressure difference. The valve block 32 has a feed medium outlet connection $F_a$ which is connected to the hydraulic circuit via a further feed pressure line 40 of the hydraulic arrangement 1.

A first and second feed valve unit 42 and 44 are connected fluidically in parallel to the feed pressure line 40. The first feed valve unit 42 has a nonreturn valve 46 which opens in the pressure medium flow direction toward the working line 6, and the feed valve unit 44 has a nonreturn valve 48 which opens in the pressure medium flow direction toward the working line 8, whereby the feed valve units 42 and 44 serve to feed pressure medium into the working lines 6 and 8, respectively.

A pressure limiting valve 50 and 52 is arranged fluidically in parallel to a respective nonreturn valve 46 and 48, in order to prevent the occurrence of critically high pressures in the first and the second working lines 6 and 8, respectively. Here, the pressure limiting valves 50 and 52 can in each case open a pressure medium connection between the working lines 6 and 8, respectively, and the feed pressure line 40.

In addition to the feed valve units 42 and 44, a pressure limiting valve 54 is arranged on the feed pressure line 40, via which pressure limiting valve 54 the feed pressure in the feed pressure line 40 is limited, for example, to 25 bar by a pressure medium connection to a tank 55.

Furthermore, an actuating pressure supply line 56 which is connected to the actuating pressure control valve 16 of the adjusting device 10 branches off from the feed pressure line 40. Pressure medium in the feed pressure line 40 therefore serves to control the actuating cylinder 12 via the actuating pressure control valve 16. A pressure cut-off valve 58 for securing the hydraulic circuit is provided in the actuating pressure supply line 56. Said pressure cut-off valve 58 is connected via a two-way valve 60 to the working line 6 or 8 at the highest pressure. A bypass valve 62 is connected fluidically in parallel to the two-way valve 60, via which bypass valve 62 the two working lines 6 and 8 can be connected.

Figure 2:
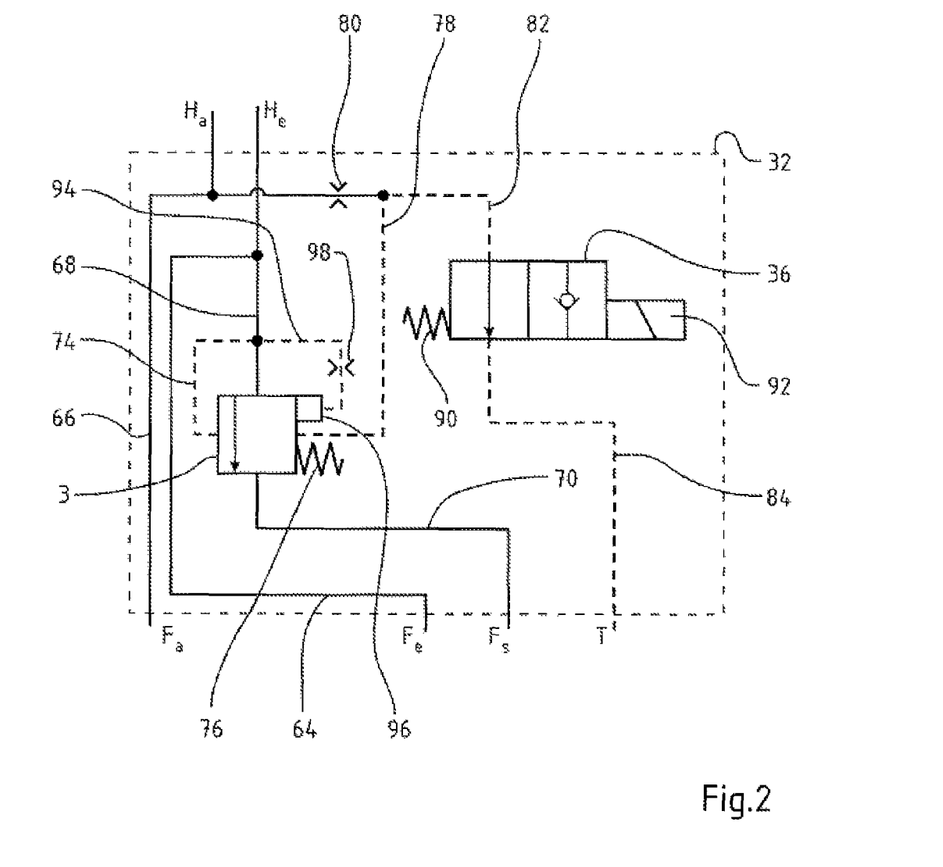
FIG. 2 shows an enlarged detail of the hydraulic circuit diagram from FIG. 1 in the region of the cold start valve.

According to FIG. 2, in addition to the feed medium inlet connection $F_e$ and the feed medium outlet connection $F_a$, the valve block 32 has a filter inlet connection $H_e$ and a filter outlet connection $H_a$ for connecting a hydraulic filter (not shown). The filter inlet connection $H_e$ is connected fluidically via a first feed pressure channel 64 of the valve block 32 to the feed medium inlet connection $F_e$. Via a second feed pressure channel 66, the filter outlet connection $H_a$ is connected fluidically to the feed medium outlet connection $F_a$ of the valve block 32. The pressure medium which is conveyed by the feed pump 24 from FIG. 1 is therefore filtered by the filter which is connected to the filter connections $H_e$ and $H_a$ before entering into the second feed pressure line 40.

The cold start valve 3 is provided for reducing the feed pressure in the feed pressure line 30 which is connected to the feed pump 24, in particular during a cold start of the hydraulic circuit. Said cold start valve 3 is connected via a pressure channel 68 to the feed pressure channel 64 and is connected via a pressure reduction channel 70 to a pressure reduction connection $F_s$ of the valve block 32. According to FIG. 1, the pressure reduction connection $F_s$ is in turn connected to a pressure reduction line 72 which is connected to the suction line 26 of the feed pump 24. Pressure medium can therefore be returned from the feed pressure line 30 to the suction line 26 via the cold start valve 3 in order to reduce the feed pressure. A valve slide of the cold start valve 3 can be loaded in the direction of its open position with the feed pressure via a control line 74 which is connected to the pressure channel 68. It can be loaded in the direction of its closed position with a spring force of a valve spring 76 and with a control pressure of a further control channel 78. Said control channel 78 is connected via a throttle 80 to the feed pressure channel 66 and is therefore provided downstream of the filter which is connected to the filter connections $H_e$ and $H_a$. The throttle 80 is arranged in a pilot channel 82 which leads to the pilot valve 36. The control channel 78 for the cold start valve 3 therefore branches off from said pilot channel 82.

The control pressure in the control channel 78 can be controlled via the pilot valve 36. Said pilot valve 36 is connected on the outlet side to a tank channel 84 which opens into a tank connection T of the valve block 32. According to FIG. 1, the tank connection T is in turn connected via a tank line 86 to a tank 88. The pilot valve 36 is a 2/2-way valve, the valve slide of which is loaded via a valve spring 90 in the direction of its open position with a spring force. In the direction of its closed position, the valve slide can be displaced via an electromagnetic actuator 92 counter to the spring force of the valve spring 90. As an alternative, the electromagnetic actuator can also act into the open position and the spring can act into the closed position of the valve.

The cold start valve 3 opens when the feed pressure in the control channel 74 is greater than the sum of the pressure equivalent of the spring force of the valve spring 76 and the control pressure in the control channel 78. The control pressure in the control channel 78 is set by the pilot valve 36, by the valve slide thereof being situated in its open or closed position. When the feed pressure is reduced by the cold start valve 3 with an open pilot valve 36, pressure medium is therefore discharged upstream of the filter inlet connection $H_e$ via the cold start valve 3 to the suction line 26.

In order to damp oscillations in the hydraulic arrangement 1 and, in particular, in the cold start valve 3, the valve slide of the cold start valve 3 is damped during a stroke movement or displacement movement. To this end, a damping channel 94 is provided which branches off from the pressure channel 68 upstream of the cold start valve 3 and is connected to a damping space 96 of the cold start valve 3. A throttle 98 is provided in the damping channel 94. Via the damping space 96, the valve slide of the cold start valve 3 can be loaded in the closing direction with a damping pressure which acts during a stroke movement of the valve slide of the cold start valve 3.

Figure 3:
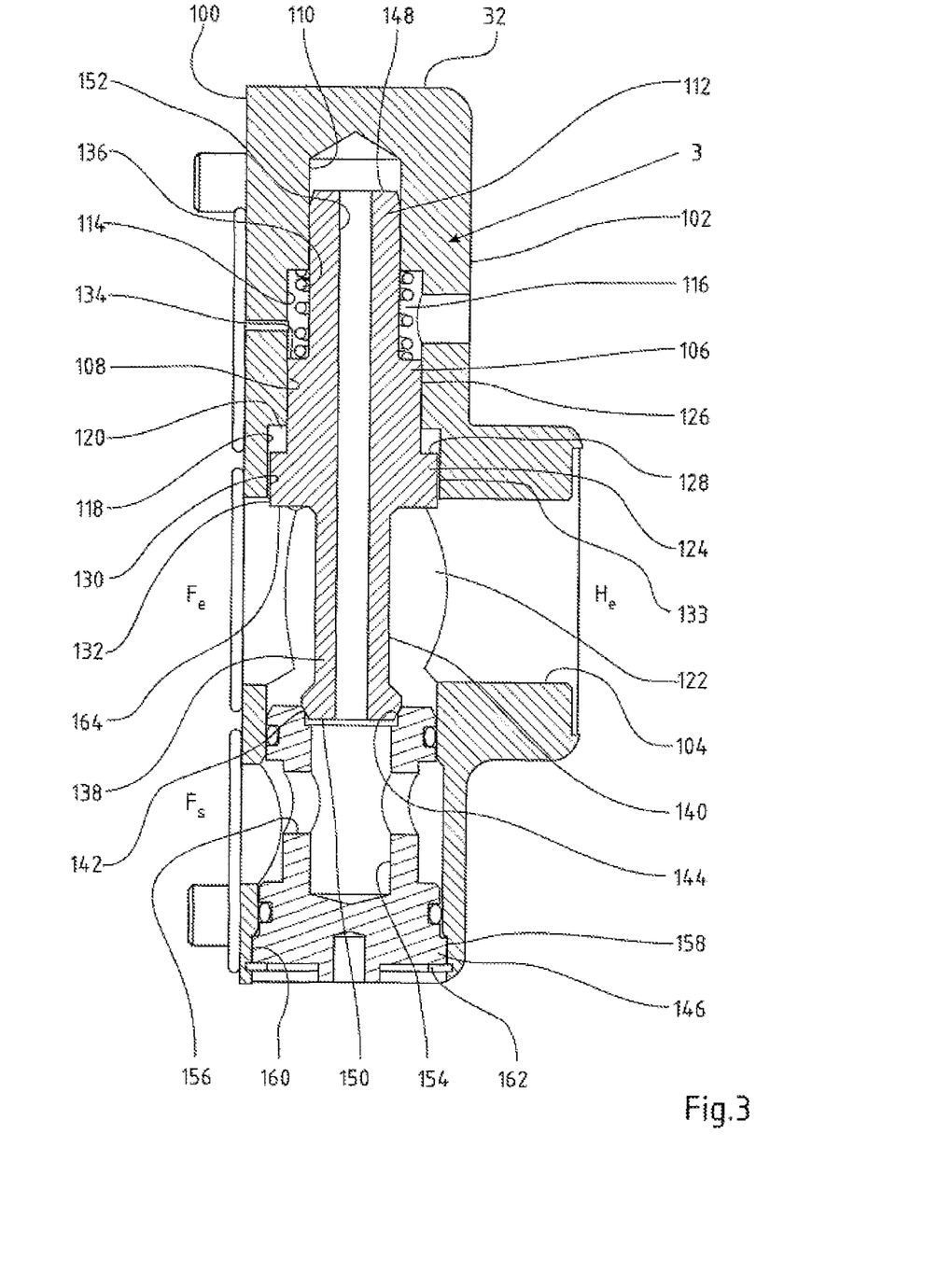
FIG. 3 shows a longitudinal section of the cold start valve according to the disclosure, in accordance with the exemplary embodiment.

Using the longitudinal section in FIG. 3 through the valve block 32 in the region of the cold start valve 3, the structural configuration of said valve block 32 will be explained in greater detail in the following text. The valve block 32 has a connection side 100, via which it can be connected, for example, to a housing of the hydraulic pump 2 from FIG. 1. According to FIG. 3, the feed medium inlet connection $F_e$ and the pressure reduction connection $F_s$, inter alia, are formed on the connection side. Here, the feed medium inlet connection $F_e$ is provided approximately centrally and the pressure reduction connection $F_s$ is arranged, as viewed in longitudinal section, at a parallel spacing from the former offset in an edge region of the valve block 32. The filter inlet connection $H_e$ is formed on the valve block 32 approximately coaxially with respect to the feed medium inlet connection $F_e$ on an upper side 102 of the valve block, which upper side 102 points away from the connection side 100. A through bore 104 which extends approximately perpendicularly with respect to the connection side 100 is made in the valve block 32 in order to form the filter inlet connection $H_e$ and the feed medium inlet connection $F_e$.

The valve block 32 serves as a valve housing for the cold start valve 3 and has a stepped bore 108 which intersects the through bore 104 approximately perpendicularly in order to receive the valve slide 106 of said cold start valve 3. Axes of the stepped bore 108 and the through bore 104 lie approximately in one plane. For the valve slide 106, the stepped bore 108 has a first step 110 which has a small diameter and in which an end section 112 of the valve slide 106 is guided slidingly. A further step 114 with a greater diameter is provided adjacently to the step 110. Together with the valve slide 112, the step 114 delimits a control space 116. An adjoining step 118 of the stepped bore 108 has an even greater diameter than the step 114. Together with the valve slide 106, said step 118 delimits a damping space 120 and opens into a bore intersection of the through bore 104 with the stepped bore 108, the bore intersection forming an inlet space 122 of the cold start valve 3.

The valve slide 106 has a radial collar 124 which is recessed radially from the end section 112 by way of a step 126. The valve slide 106 is then arranged with the non-recessed section of the radial collar 124 in the third step 118. As a result of the step 126, the radial collar 124 has an annular face 128 which forms a damping face 128 of the cold start valve 3. Together with the step 118 of the stepped bore 108, it delimits the damping space 120. An external diameter of the non-recessed section of the radial collar 124 which has substantially a circular cross section has a smaller external diameter than the internal diameter of the step 118. An intermediate space 133 which has approximately a hollow circularly cylindrical cross section is therefore formed between an inner circumferential face 130 of the step 118 and an outer circumferential face 132, which intermediate space 133 connects the damping space 120 fluidically to the inlet space 122 in a throttled manner and therefore corresponds to the damping channel 94 with the throttle 98 from FIG. 2. A width of the intermediate space 133 which is formed between the inner and outer circumferential face 130, 132 is approximately from 0.1 mm to 0.2 mm. In particular, the width is 0.15 mm, the external diameter of the annular space being 28.00 mm and the inner diameter of the annular space being 27.85 mm, in particular.

That section of the radial collar 124 which is recessed by way of the step 126 is guided slidingly at least in sections in the second step 114 of the stepped bore 108, since its external diameter corresponds approximately to the internal diameter of the second step 114. An end face 134 of the radial collar 124, which end face 134 points toward the end section 112 and is formed on the recessed section, serves as a control space 134 which, together with the step 114 of the stepped bore 108, delimits the control space 116. Said control space 116 is connected to the pilot channel 82 from FIG. 2 either via the channels which are not described in further detail for the sake of simplicity and are shown in FIG. 3 or in another conventional way. A valve spring 136 is arranged in the annular control space 116, which valve spring 136 is supported on the second step 114 of the stepped bore 108 and loads the valve slide 106 via its control face 134 with a spring force in the closing direction. Here, the valve spring 136 encompasses the end section 112 of the valve slide 6 which has dipped in sections into the first step 110. Starting from the radial collar 124, a further end section 138 of the valve slide 106 extends away from the end section 112. Said further end section 138 is recessed radially by way of an annular groove 140, in order to reduce a flow resistance of a pressure medium flow between the feed medium inlet connection $F_e$ and the filter inlet connection $H_e$, since the end section 138 penetrates the through bore 104. A diameter of the valve slide 106 in the region of the radial groove 140 is smaller than the diameter of the end section 112. The end section 138 is beveled by way of a bevel 142 on the end side. The valve slide 106 can bear against a seat face 144 of a valve seat 146 by way of said bevel 142. An end face 148 of the end section 112 and an end face 150, encompassed by the annular seat face 144, of the end section 138 are substantially identically large. The valve slide 106 is penetrated axially by a through bore 152 in order to equalize a pressure which acts on the end faces 148 and 150.

The valve seat 146 is of sleeve-like configuration, is inserted on the end side into the stepped bore 108 and is spaced apart somewhat from the through bore 104. It has a blind bore 154 which is made from the inlet space 122 and a transverse bore 156 which intersects said blind bore 154. Here, the transverse bore 156 is connected fluidically to the pressure reduction connection $F_s$, as a result of which, in the raised state of the valve slide 106 from the valve seat 146, the feed medium inlet connection $F_e$ is connected via the blind bore 154 and the transverse bore 156 to the pressure reduction connection $F_s$. The seat face 144 is formed on the end side of the blind bore 154 and encompasses the latter, as a result of which, in a state in which it is placed onto the valve 146, the valve slide 106 closes the blind bore 154 and a pressure medium connection between the feed medium inlet connection $F_e$ and the pressure reduction connection $F_s$ is shut. In order to secure the valve seat 146, the valve seat 146 has a radial collar 158 which is supported on a further step 160 of the stepped bore 108 in the direction toward the valve slide 106 and is secured in the opposite direction by a securing ring 162 which is inserted into an annular groove of the stepped bore 108. Here, the valve seat 146 is inserted sealingly into the stepped bore 108 via sealing elements, in particular O-rings.

A further control face 164 which points away from the end face 148, the control face 134 and the damping face 128 is formed on the radial collar 124 of the valve slide 106. Said further control face 164 delimits the inlet space 122 in sections. Here, the size of the control face 164 corresponds substantially to a sum of the damping face 128 and the control face 134.

In the following text, the method of operation of the cold start valve 3 from FIG. 3 will be explained in greater detail. In the closed state (shown in FIG. 3) of the cold start valve 3, the damping space 120 and the inlet space 122 are pressure equalized, as a result of which that area of the control face 164 which acts in the opening direction corresponds to the control face 134 which acts in the closing direction. If the feed pressure in the inlet space 122 exceeds the sum of the control pressure in the control space 116 and a pressure equivalent of the spring force of the valve spring 136, the valve slide 106 is moved away from the valve seat 146. During this stroke movement, the damping space 120 is reduced in size, as a result of which a damping pressure which acts on the damping face 128 rises above the feed pressure and counteracts this stroke movement. During this stroke movement, pressure medium is discharged via the intermediate space 133 in a throttled manner from the damping space 120 to the inlet space 122, as a result of which the pressure in the damping space 120 is adjusted to the feed pressure in the inlet space 122 after a certain time.

If, in an open position, the valve slide 106 performs a stroke movement in the direction of the valve seat 146 when the feed pressure is smaller than the sum of the control pressure and the pressure equivalent of the spring force of the valve spring 152, this leads to an increase in the size of the damping space 120, as a result of which the damping pressure drops. A pressure difference results between the damping pressure which acts on the damping face 128 and the feed pressure which acts on a face section of the control space 164, which face section is congruent with the damping face 128 as viewed in the axial direction, the force equivalent of which pressure difference counteracts the stroke movement of the valve slide 106. If the size of the damping space 120 is increased, said damping space 120 is loaded by a pressure medium from the inlet space 122 via the intermediate space 133, as a result of which the damping pressure in the damping space 120 is adjusted to the feed pressure in the inlet space 122 after a defined time.

The valve slide 106 is therefore damped in both directions of its stroke movement counter to its movement direction on account of the damping space 120 and the damping face 128, a damping force being dependent on a stroke speed of the valve slide 106. The higher the stroke speed, the higher the damping force.

In addition or instead of the damping space 120, it would also be conceivable to use a throttle in the through bore 152 of the valve slide 106. However, a damping action would be smaller as a result of this, since the through bore 152 and therefore the end faces 148 and 150 of the valve slide 106 are connected to the pressure reduction connection $F_s$ which as a rule has a tank pressure level. Furthermore, a throttle which is inserted into the through bore 152 could become detached, for example, in particular on account of different coefficients of expansion between the throttle and the valve slide 106.

Figure 4:
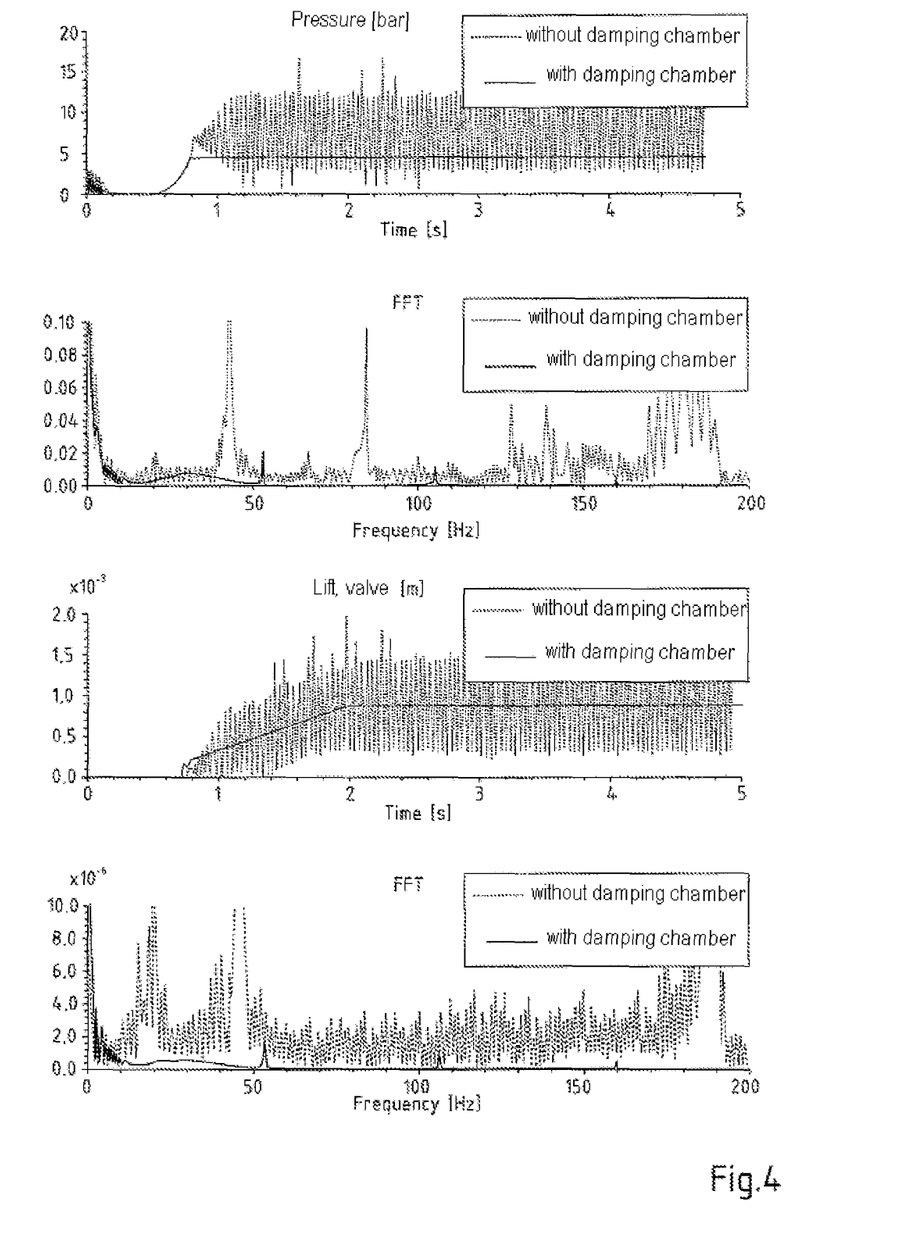
FIG. 4 shows a plurality of line graphs.

FIG. 4 comprises a plurality of diagrams, in which in each case a cold start valve 3 according to the disclosure with a damping chamber 120 and a cold start valve without a damping chamber according to the prior art are compared with one another. A pressure profile of the feed pressure over time is plotted in the uppermost diagram. It can be seen that the pressure fluctuations of the cold start valve according to the disclosure turn out to be extremely low. In contrast, the pressure of a conventional cold start valve has very pronounced fluctuations.

In the third diagram, viewed from the top, a stroke path of the valve slide of a cold start valve according to the disclosure is shown which has small fluctuations. In contrast, the stroke path shown of the conventional cold start valve once again has pronounced fluctuations.

The second diagram and the fourth diagram, as viewed from the top, show amplitudes of certain oscillations of a cold start valve according to the disclosure and a conventional cold start valve.

A cold start valve is disclosed, in particular according to the disclosure, for a hydraulic circuit, in particular for a closed hydraulic circuit. The cold start valve has a valve slide which has two counteracting control faces, it being possible for the first control face to be loaded with a control pressure and for the second control face to be loaded with a feed pressure. In addition, the first control face is loaded with the spring force of a valve spring. In order to damp a stroke movement of the valve slide, a damping space is provided which is delimited by a damping face which is formed on the valve slide and is oriented in accordance with the first control face. The damping face can be loaded via the damping space with a damping pressure in order to damp the stroke movement. The damping space is connected in a throttled manner to a pressure space, via which the second control face of the valve slide can be loaded with the feed pressure.

What is claimed is:

1. A cold start valve for a hydraulic circuit, the valve comprising:
   a valve slide configured to open and close in a controlled manner a pressure medium connection between a pressure connection and an outlet connection;
   a control space delimited by a first control face of the valve slide, the first control face configured to be loaded with pressure medium in a closing direction;
   an inlet space connected fluidically to the pressure connection and delimited by a second control face of the valve slide, the second control face configured to be loaded with pressure medium in an opening direction; and
   a damping space connected fluidically via an intermediate space, which acts in a throttled manner, to the inlet space and delimited by a damping face of the valve slide, the damping face configured to be loaded with pressure medium,
   wherein the valve slide is configured to be loaded in the closing direction by a spring force of a valve spring.

2. The cold start valve according to claim 1, wherein a size of the second control face corresponds approximately to a sum of a size of the first control face configured and a size of the damping face.

3. The cold start valve according to claim 1, wherein:
   the second control face is a first end face of a radial collar of the valve slide, the radial collar is recessed with a step,
the damping face is an annular face formed by the step and configured to point away from the first end face, and
the first control face is a second end face of the radial collar.

4. The cold start valve according to claim 1, wherein said cold start valve is a seat valve.

5. The cold start valve according to claim 4, wherein:
the valve slide is arranged in a stepped bore made in a valve housing,
the valve slide is guided slidingly with an end section configured to point away from a valve seat in a first step of the stepped bore, the first step having a smallest diameter,
the valve slide is configured to delimit the control space with the first control face and with a second step of the stepped bore, the second step adjoining the first step,
the valve slide is configured to delimit the damping space with the damping face and with a third step of the stepped bore, the third step adjoining the second step.

6. The cold start valve according to claim 5, wherein:
the valve spring is arranged in the control space,
the valve spring is supported on the second step of the stepped bore, and
the valve spring is configured to load the valve slide with the spring force via the first control face.

7. The cold start valve according to claim 5, wherein:
the damping space is connected fluidically to the inlet space via an intermediate space between an inner circumferential face of the third step and an outer circumferential face of the radial collar of the valve slide.

8. The cold start valve according to claim 7, wherein the intermediate space is an annular space.

9. The cold start valve according to claim 8, wherein a width of the annular space is between approximately 0.10 mm and 0.2 mm.

10. The cold start valve according to claim 9, wherein the width of the annular space is 0.15 mm.

11. The cold start valve according to claim 9, wherein an external diameter of the annular space is 28.00 mm and an internal diameter of the annular space is 27.85 mm.

12. The cold start valve according to claim 1, wherein:
the valve slide includes a first end and a second end that is opposite the first end and that is configured to interact with a valve seat to form the valve;
the second control face is located on the second end; and
the damping face and the first control face are located on the valve slide between the first end and the second end.

13. The cold start valve according to claim 1, wherein:
the damping space and the intermediate space, which acts in a throttled manner, are delimited by a sidewall of the valve slide.

14. A hydraulic arrangement for a hydraulic circuit comprising:
a working pump configured to supply pressure medium to a hydraulic consumer;
a feed pump configured to supply pressure medium to at least one feed valve unit for the hydraulic circuit; and
a cold start valve configured to limit a feed pressure upstream of the feed pump, the cold start valve, including:
a valve slide configured to open and close in a controlled manner a pressure medium connection between a pressure connection and an outlet connection;
a control space delimited by a first control face of the valve slide, the first control face configured to be loaded with pressure medium in a closing direction;
an inlet space connected fluidically to the pressure connection and delimited by a second control face of the valve slide, the second control face configured to be loaded with pressure medium in an opening direction; and
a damping space connected fluidically via an intermediate space, which acts in a throttled manner, to the inlet space and delimited by a damping face of the valve slide, the damping face configured to be loaded with pressure medium,
wherein the valve slide is configured to be loaded in the closing direction by a spring force of a valve spring.

15. The hydraulic arrangement according to claim 14, further comprising:
a pilot valve configured to control a control pressure which acts on the second control face, active in the opening direction, of the valve slide of the cold start valve.

16. The hydraulic arrangement according to claim 15, wherein:
the cold start valve and the pilot valve are arranged in a valve block,
the cold start valve is configured to control a pressure medium connection between a feed medium inlet connection of the valve block and a pressure reduction connection of the valve block, and
the feed medium inlet connection is configured to be connected to an outlet connection of the feed pump.

* * * * *